United States Patent Office 3,207,661
Patented Sept. 21, 1965

3,207,661
BIS-(AZIRIDINYL)-PHOSPHINOTHIOIC ESTERS AS CHEMICAL STERILANTS FOR INSECTS AND MITES
George G. Curtis, Elizabeth, and Bernard Buchner, Westfield, N.J., assignors, by mesne assignments, to The American Agricultural Chemical Company, a corporation of Delaware
No Drawing. Filed Jan. 11, 1963, Ser. No. 250,775
6 Claims. (Cl. 167—33)

This invention relates to novel pesticides, pesticidal methods and compositions and this application is a continuation-in-part of our application Serial No. 62,884, filed October 17, 1960, now abandoned.

To facilitate the understanding of this invention a few terms, as used herein, shall be clarified first. Pests are insects, and mites which amongst others, are harmful to plants or animals. "Pesticides" are chemicals useful for the eradication of pests. "Insecticides" and "miticides" are pesticides, which are toxicants to the insects and mites and kill the insects and mites when applied in insecticidal or miticidal amounts. "Chemosterilants" are pesticides which sterilize either the male or female species of the insect, or both, impairing their reproductive ability when applied in chemosterilizing amounts. Both insecticides and chemosterilants act by contact. Such contact can be caused by a topical application of the chemical or by oral application (contact by ingestion). For oral application the pesticide is applied to the food of the insects. Pesticides can act on the eggs of the insects, or on the larvae (larvicides), or on the pupae (pupicides) or on the adult insects. A specific pesticide may act on one species of insect as insecticide and on another species of insects as chemosterilant, or may act on one species of insect depending on dosage or method of application as insecticide or chemosterilant.

The compounds of this invention are novel and useful chemosterilants. With their use novel methods for combating pests have been developed with the ultimate goal of eradicating the pests.

Reference is made to "Sterile-Male Method of Population Control," by E. F. Knipling, "Science," October 9, 1959, vol. 130, No. 3380, pages 902 to 904. This article explains the effectiveness of insect sterilization in insect eradication. Originally sterilization was accomplished by irradiation. The necessary equipment is expensive and its use is complicated. Chemosterilants are easy to handle and apply. They do not require the type of safety precautions and the precision necessary for irradiation. The sterilization method whether by irradiation or applied by chemosterilants, is based on a number of observations, findings and assumptions. Many insects show that the male species is polygamic, whereas the female species is monogamic and will mate with only one single male. Sterilization can be accomplished in supervised breeding places, e.g. in a laboratory. Chemosterilants are applied at these breeding places. The sterilized insects are released over infested areas where they are scheduled to compete with the untreated normal males and females. Therefore, a chemosterilized insect should be healthy and vigorous. The sterilized females have secondary importance. The sterilized males, on the other hand, will reduce the population by mating the productive untreated females, who in turn then will not mate with other untreated males.

Chemosterilization can also be applied by the baiting method, whereby the chemosterilants are incorporated in effective proportions to food or food mixture of an insect species and the treated food distributed in the field. Reference is made to the article entitled "A Field Experiment in the Control of House Flies with Chemosterilant Baits," by G. C. La Brecque, Carroll N. Smith, and D. W. Meifert, in the Journal of Economic Entomology, vol. 55, No. 4, pages 449 to 451. In the case of house flies a mixture of corn meal, sugar, powdered milk and powdered egg may form a suitable bait. In chemosterilizing Mexican fruit flies methyl eugenol is a satisfactory bait.

For the rating of a particular chemosterilant, it is desirable that it should sterilize both males and females. If, however, it acts solely on the male species, it is still considered a useful chemosterilant. Sole action on the female species, without action on the male species, excludes a chemosterilant from practical usefulness. A chemosterilized female will not lay eggs (will show no oviposition), whether mated with a sterilized or untreated male. The mating of a sterilized male with a productive untreated female will show oviposition but will result in no viable eggs; the eggs will not hatch. In some cases larvae may be formed but no pupae developed. In other cases pupae may be formed but no adults will hatch therefrom. In most cases no larvae are formed. Indications are on hand that in some cases a chemosterilized female, when mating with an untreated male, may influence the reproductive ability of the latter either in the first or in subsequent generations.

The pesticidal compounds of this invention are ethylenimine derivatives of monosubstituted phosphorodichloridothionates. Still more particularly, this invention is directed to diethylenimine derivatives of monosubstituted phosphorodichloridothionates, wherein the monosubstituent radicals belong to a well defined class.

The monosubstituted phosphorodichloridothionates which are reacted with an ethylenimine to form the pesticidally active compounds and reaction products in accordance with this invention have the following general structural formula:

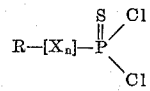

wherein X is selected from the group consisting of oxygen and sulfur, wherein $n$ is a digit seelcted from the group consisting of zero and one and wherein R is a radical selected from the group consisting of (a) aliphatic (alkyl and alkenyl), (b) aryl, (c) alkaryl, (d) aralkyl, (e) alicyclic radicals and (f) heterocyclic radicals wherein there is nitrogen as a heteroatom present in the ring, bonded to the phosphorus atom of the molecule. If R is a heterocyclic radical then $n$ is zero.

In order to produce the active compounds of this invention, ethylenimine or a C-substituted ethylenimine is reacted with the above described monosubstituted phosphorodichloridothionates. The resulting pesticides of this invention are mono-substituted derivatives of bis(1-aziridinyl)-phosphinothioic acid, where the substitution occurs at the phosphorus atom. They are phosphorodiamidothionates of the general structural formula:

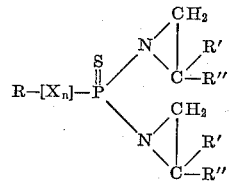

wherein R, X and $n$ are as described hereinabove and R' and R" are selected from a group consisting of hydrogen and a hydrocarbyl radical, such as an alkyl radical and an aryl radical, containing 1–12 carbon atoms.

The RX-grouping of the monosubstituted phosphorodichloridothionates employed in the preparation of the novel compounds of this invention wherein $n$ is one, may be derived from any suitable source, such as alcohols, phenols, thioalcohols (mercaptans) and thiophenols.

In the novel compounds of this invention where X is oxygen, R may be a substituted or unsubstituted (hydrocarbyl) aliphatic radical containing from one to eighteen carbon atoms ($C_1$–$C_{18}$), preferably from two to twelve carbon atoms. The aliphatic radical can be straight chain or branched chain and saturated or unsaturated. Suitable examples of unsubstituted hydrocarbyl aliphatic radicals are the alkyl and alkenyl radicals, such as methyl, ethyl, n-propyl, isopropyl, n-butyl, isobutyl, n-amyl, isoamyl, hexyl, 2-ethylbutyl, heptyl, 2-methylpentyl, 3-methylethyl, n-octyl, 2-ethylhexyl, nonyl, decyl, undecyl, dodecyl, tridecyl, tetradecyl, hexadecyl, heptadecyl, 3,5,5-trimethylhexyl, octadecyl, as well as the corresponding alkenyl radicals, e.g. octadecenyl, undecenyl, etc.

When R is a substituted aliphatic radical, such as a substituted alkyl radical and X is oxygen, the following radicals are suitable: 2-chloroethyl, 3-chloro-1-propyl, 4-chloro-1-butyl, 2-methoxyethyl, 2-ethoxyethyl, 2-propoxyethyl, 2-butoxyethyl, methoxy-methoxy-ethyl, the alkyl radical of the oxoalcohol of a propylene dimer, as well as a substituted alkyl radical derived from tertiary aminoalcohols, e.g. diethylaminoethyl, dimethylaminoethyl, diisopropylaminoethyl and dibutylaminoethyl.

When R is an aryl radical, preferably an aryl radical containing 6–18 carbon atoms (including alkaryl and aralkyl radicals), the following radicals are suitable: phenyl, cresyl, naphthyl, xylyl, benzyl, beta-phenylethyl, phenylpropyl, cinnamyl and styryl.

When R is a substituted aryl radical and X is oxygen, the following radicals are suitable: 4-chlorophenyl, 2,4,5-trichlorophenyl, pentachlorophenyl, 4-bromo-2,6-dichlorophenyl, 2,4,6-trichlorophenyl, 3,4-dichlorophenyl, 2,3,4,5-tetrachlorophenyl, 2-cyclohexylphenyl, 4-methoxyphenyl, 2,6-dicyclohexyl-4-methyl-phenyl, 4-cyclohexylphenyl, 3-ethylphenyl, 4-nonylphenyl, 4-methyl-phenyl, 3,4-dimethylphenyl, 4-tertiarybutyl-2-chlorophenyl, and 2-chloro-4-cyclohexylphenyl.

When R is an alicyclic radical, preferably containing 3–18 carbon atoms, the following radicals are suitable: cyclopentyl, cyclopropyl, cyclobutyl, cyclohexyl, as well as their corresponding halo-substituted, methoxy-substituted and Tert-amino-substituted radicals.

When R is a heterocyclic radical, preferably a heterocyclic radical containing 5–12 carbon atoms, the following are suitable: furfuryl and tetrahydrofurfuryl, as well as their corresponding halo-substituted, methoxy-substituted and Tert-amino-substituted radicals.

In the instance where X is sulfur, R may be any of the radicals identified hereinabove where X is oxygen, such as one of the following radicals: methyl, ethyl, propyl, butyl, amyl, hexyl, heptyl, octyl, nonyl or the radicals derived from thiophenol (phenyl), 4-chlorothiophenol (4-chlorophenyl), 2,5-dichlorothiophenol (2,5-dichlorophenyl), 2,4,5-trichlorothiophenol (2,4,5-trichlorophenyl) the thiocresols, benzyl mercaptan (bencyl), cyclohexyl mercaptan (cyclohexyl), alpha-furfuryl mercaptan, betachloropropyl mercaptan, etc.

A suitable substituted phosphorodichloridothionate wherein X is S, is illustrated by:

Where $n$ is an integer of zero and R is an alkyl or aryl grouping, the substitution produces a carbon-to-phosphorus bond. Examples of suitable thiophosphoryl dichlorides to form the diaziridinyl compounds are: phenyl phosphono-dichloridothionate ($C_6H_5PSCl_2$), ethyl phosphonodichloridothionate ($C_2H_5PSCl_2$), propyl phosphono-dichloridothionate ($C_3H_7PSCl_2$) and butyl phosphono-dichloridothionate ($C_4H_9PSCl_2$).

As stated above, R may also be a heterocyclic radical wherein there is nitrogen present in the cyclic ring as a heteroatom and bondage to the phosphorus occurs at the N atom. The $n$ of the general structural formula in this alternative is zero. The nitrogen compounds yielding these radicals contain preferably a monoimine group and can be illustrated by hexamethylenimine, piperidine, morpholine and pyrrolidine.

In accordance with this invention the novel compounds and reaction products described herein are formed by reacting mono-substituted phosphorodichloridothionates with an ethylenimine, preferably in the ratio 2 mols of the ethylenimine to 1 mol of the mono-substituted phosphorodichloridothionate. The ethylenimine employed in the preparation of the novel compounds of this invention may be substituted at one of the carbon atoms. The following compounds are exemplary of such substituted ethylenimine and are suitable for use in the preparation of the novel compounds of this invention:

2-methylethylenimine
2-ethylethylenimine
2,2-dimethylethylenimine
2-propylethylenimine
2,2-diethylethylenimine
2-hexylethylenimine
2-ethyl-2-phenylethylenimine
2-propyl-2-phenylethylenimine
2-phenylethylenimine The preparation of ethylenimines is well known. These compounds may be prepared by reacting the corresponding 2-haloethylamine with sodium hydroxide or by reacting the sulfuric esters of the corresponding 2-hydroxyethylamines with sodium hydroxide.

The monosubstituted phosphorodichloridothionates, wherein $n$ is one, employed in the preparation of the novel compounds of this invention can also be considered as or described as monoesters of phosphorodichloridothioic acid. In the instance where R is an alkyl group, they may be referred to as O-alkyl phosphorodichloridothionates or S-alkyl phosphorodichloridothionates. Methods preparing these monosubstituted phosphorodichloridothionates are well known in the art. For example, one method of preparing such compounds is illustrated by the following chemical equation.

The chemical reaction indicated by the above equation is applicable where X is oxygen. Where X is sulfur, various other methods are also known. For example, S-(2,4,5-trichlorophenyl) phosphorodichloridothionate is prepared from the respective thiophenol by reacting it with an excess of $PSCl_3$ under the influence of heat and in the presence of magnesium chloride as a catalyst. Preparation of $C_2H_5SPSCl_2$ has been made by reacting $PCl_3$ with ethyl mercaptan to obtain the intermediate compound $C_2H_5SPCl_2$ which is then heated in a sealed tube with sulfur to yield the desired end product.

The reaction between the ethylenimines and the monosubstituted phosphorodichloridothionates for the preparation of the novel compounds and reaction products of this invention is described and illustrated by the following chemical equation.

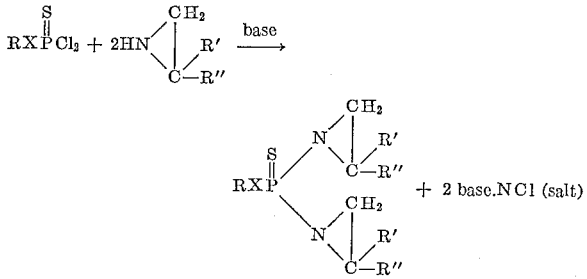

R, R′, R″ and X in the above equation are as described hereinabove.

In the preparation of the novel compounds of this invention, it is preferred to carry out the preparation of these compounds in a two-step operation, i.e. the preparation of the monosubstituted phosphorodichloridothionate and then the reaction of this compound with the ethylenimine. It is possible, however, to start with PSCl₃ and react it with an alcohol or other suitable compound for the preparation of the desired monosubstituted phosphorodichloridothionate and then to react directly the formed monosubstituted phosphorodichloridothionate with ethylenimine or a C-substituted derivative thereof without the separation or isolation of the aforementioned monosubstituted phosphorodichloridothionate as an intermediate step.

The reaction between the monosubstituted phosphorodichloridothionate and the ethylenimine in accordance with this invention can be carried out in various ways. It is essential, however, that the reaction be carried out in the presence of an acid acceptor, e.g., alkaline-acting or basic materials capable of binding the acid evolved in the reaction. When the reaction is carried out in the presence of an organic, non-aqueous solvent, such as a hydrocarbon solvent, e.g., benzene, toluene, petroleum ether and the like, suitable acid acceptors or alkaline or basic-acting materials are the tertiary amines, such as triethylamine, pyridine, N-ethylmorpholine and the like.

In the preparation of the novel compounds of this invention, relatively careful temperature control is maintained during the chemical reaction involving the ethylenimine and the monosubstituted phosphorodichloridothionate. The reaction temperature should be maintained at a conveniently low temperature, preferably below about 50° C., desirably in the range 0–20° C., more or less.

The separation of the resulting reaction product from the reaction mixture is readily accomplished. For example, the salt, such as a tertiary amine hydrochloride salt formed during the chemical reaction due to the presence of a tertiary amine compound therein as an acid acceptor, is separated from the product-containing reaction admixture by simple means, such as by filtration, and the solvent removed from the resulting filtrate by distillation, preferably by low temperature, vacuum distillation. The product, if desired, can again be purified by distillation under high vacuum while maintaining the temperature as low as possible to prevent any decomposition of the product.

In accordance with one feature of this invention, it has been found that particularly desirable results are obtainable by carrying out the reaction of the ethylenimine and the monosubstituted phosphorodichloridothionate in the presence of water or an aqueous medium. It has been found that the novel compounds and reaction products of this invention, when prepared in a non-aqueous reaction mixture, exhibit a tendency to polymerize whereas the novel compounds and reaction products of this invention when prepared in an aqueous system are much more stable and exhibit greatly improved storage stability. The fact that the novel products of this invention can be prepared in an aqueous system is surprising in view of the fact that usually monosubstituted phosphorodichloridothionates are water-insoluble or exhibit low water solubility. It is only necessary, however, in the practice of this feature of this invention, i.e., carrying out the reaction in an aqueous system, that one of the reactants, preferably the ethylenimine, exhibits any substantial water solubility. Suitable water-soluble ethylenimines include ethylenimine and 2-methylethylenimine. We have found that the compounds of this invention are simply and economically prepared in an aqueous system, yielding storage stable compounds.

For carrying out the preparation of the products, their utility other than what is herein described, reference is made to the above identified parent application. The products have advantageous herbicidal properties when applied as preemergent and/or postemergent herbicides.

The reaction products of this invention react with carboxylic acids to give substituted phosphoramidothionate alkyl carboxylates. Hydration reactions in aqueous alkaline media form alcohols. These compounds also react with salts of phenols (phenolates) and react with xanthates to give phosphoramidothionate alkyl xanthate esters. Reaction with sulfhydryl groups give thioethers; with alcohol-alkoxides they yield ethers. They also react with active methylene groups, such as malonitrile, cyclopentadiene, nitromethane, etc.

ILLUSTRATIVE COMPOUNDS AND EXAMPLES FOR THEIR PREPARATION

The pesticidal activity of the compounds of this invention is illustrated with 15 compounds, which are numbered for ease of reference. The illustration is in no way intended to limit the scope of this invention. Reference is also given to methods of their preparation.

Group A.—Propylenimine Derivatives

*Compound 1: O-ethyl, N,N'-dipropylene phosphorodiamidothionate.*—This compound is also known as O-ethyl, bis(1-(2-methyl) aziridinyl) phosphinothionate, having the structural formula:

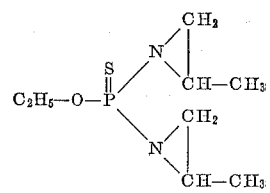

It can be prepared according to Example No. 8 of the parent application. The following physical constants were established: refractive index $n_D^{20}$ 1.500 and density $d^{20}_4$ 1.087.

*Compound 2: O-propyl, N,N'-dipropylene phosphorodiamidothionate.*—This compound is also known as O-propyl, bis(1-(2-methyl) aziridinyl) phosphinothionate. It can be prepared according to the scheme outlined in Example No. 1 of the parent application, substituting propylenimine for ethylenimine and using therewith O-n-propyl phosphorodichloridothionate as reactant. All substitutions are on equimolecular basis.

*Compound 3: O-phenyl, N,N'-dipropylene phosphorodiamidothionate.*—This compound is also known as O-phenyl, bis(1-(2-methyl) aziridinyl) phosphinothionate. It can be prepared according to the scheme outlined in Example No. 1 of the parent application, substituting propyleneimine for ethylenimine and using therewith O-phenyl phosphorodichloridothionate as reactant. All substitutions are on equimolecular basis.

Group B. Derivatives of 2,2-dimethylenimine

*Compound 4: O-ethyl, N,N'-bis(2,2-dimethylethylene) phosphorodiamidothionate.*—This compound is also known as O-ethyl bis(1-(2,2-dimethyl) aziridinyl) phosphinothionate. It can be prepared according to Example No. 9 of the parent application, with the change that after completion of the addition the reaction admixture is agitated for about 3 hours at about 30° C., before starting to recover and separate the reaction products. The ethylenimine is substituted with 2,2-dimethylethylenimine, using O-ethyl phosphorodichloridothionate as a reactant therewith. All substitutions are on equimolecular basis.

*Compound 5: O-propyl, N,N'-bis(2,2-dimethylethylene) phosphorodiamidothionate.*—This compound is also known as O-propyl bis(1-(2,2-dimethyl) aziridinyl) phosphinothionate. It can be prepared in the manner outlined for Compound 4, substituting 2,2-dimethylethylenimine for ethylenimine and reacting therewith O-propyl phosphorodichloridothionate. All substitutions are on equimolecular basis.

*Compound 6: O-phenyl, N,N'-bis(2,2-dimethylethylene) phosphorodiamidothionate.*—This compound is also known as O-phenyl bis-(1-(2,2-dimethyl) aziridinyl) phosphinothionate. It can be prepared in the manner outlined for Compound 4, substituting 2,2-dimethylethylenimine for ethylenimine and reacting therewith O-phenyl phosphorodichloridothionate. All substitutions are on equimolecular basis.

*Group C.—Derivatives of ethylenimine*

*Compound 7: O-ethyl, N,N'-diethylene phosphorodiamidothionate.*—This compound is also known as O-ethyl, bis(1-aziridinyl) phosphinothionate or as phosphinothionic acid, bis(1-aziridinyl)-, O-ethyl ester and has the structural formula:

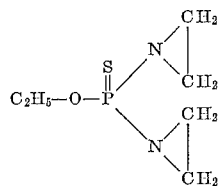

It can be prepared according to Example Nos. 1, 5, 6 and 7 of the parent application. A less satisfactory preparation method is described in Example 10 of the parent application. The following physical characteristics were established for this compound: refractive index $n_D^{20}$ 1.5202, density $d_4^{20}$ 1.160.

*Compound 8: O-propyl, N,N'-diethylene phosphorodiamidothionate.*—This compound is also known as phosphinothionic acid, bis(1-aziridinyl)-, O-propyl ester. It has the structural formula:

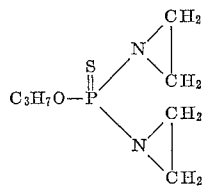

It can be prepared according to Example Nos. 2 and 9 of the parent application. The following physical constants were established: refractive index $n_D^{20}$ 1.5139 and density $d_4^{20}$ 1.135.

*Compound 9: O-butyl, N,N'-diethylene phosphorodiamidothionate.*—This compound is also known as O-butyl, bis-(1-aziridinyl) phosphinothionate. It can be prepared according to Example No. 1 of the parent application, reacting ethylenimine and O-butyl phosphorodichloridothionate, substitution being made on equimolecular basis.

*Compound 10: O-isoamyl, N,N'-diethylene phosphorodiamidothionate.*—This compound is also known as phosphinothioic acid, bis(1-aziridinyl)-, O-isopentyl ester and has the structural formula:

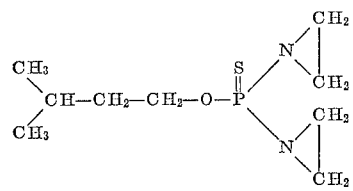

It can be prepared according to Example No. 3 of the parent application. The following physical constants were established: refractive index $n_D^{20}$ 1.5055, density $d_4^{20}$ 1.086.

*Compound 11: O-decyl, N,N'-diethylene phosphorodiamidothionate.*—This compound is also known as phosphinothioic acid, bis(1-aziridinyl)-, O-decyl ester. It can be prepared according to Example I following here below.

EXAMPLE I 23 grams (1.0 mol) of sodium was dispersed in 1 liter of dry toluene by stirring and heating to reflux. Then 174.1 g. (1.1 mol) of decyl alcohol was added dropwise. Heating of the mixture was continued until all the sodium had reacted. This mixture was added portionwise at room temperature to a solution of 169.5 g. (1.0 mol) of thiophosphoryl chloride in 2.5 liters of benzene. After the addition was completed, the mixture was heated to reflux for 3 hours. Twenty milliliters of water was added when the mixture had been cooled to room temperature. After being stirred for five minutes, the slurry was filtered and the solution dried over anhydrous magnesium sulfate, and refiltered. The clarified filtrate was then added dropwise to a precooled solution at 5° of 103.5 g. (2.4 mol) of ethylenimine and 242.0 g. (2.4 mol) of triethylamine in 300 ml. of benzene. After the addition was completed, stirring was continued for another 2 hours at room temperature. Triethylamine hydrochloride was removed by filtration, the filtrate washed with a 5% sodium carbonate solution, dried, and the benzene removed by distillation at 30° under vacuum. The residue was then purified by distillation under high vacuum to give the product, O-n-decyl N,N'-diethylene phosphorodiamidothionate. (Illustrative Compound 11.)

*Compound 12: O-phenyl, N,N'-diethylene phosphorodiamidothionate.*—This compound is also known as phosphinothioic acid, bis(1-aziridinyl)-, O-phenyl ester and has the structural formula:

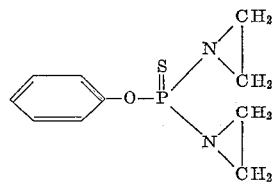

It can be prepared according to Example No. 4 of the parent application. The following physical constants were established: refractive index $n_D^{20}$ 1.5799 and density $d_4^{20}$ 1.233.

*Compound 13: O-2-chloroethyl, N,N'-diethylene phosphorodiamidothionate.*—This compound is also known as phosphinothioic acid, bis-(1-aziridinyl)-, O(2-chloroethyl) ester. It has the following structural formula:

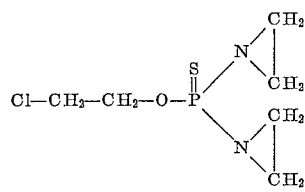

It can be prepared according to Example No. 11 of the parent application. The following physical constants of this compound were established: refractive index $n_D^{20}$ 1.5407 and density $d_4^{20}$ 1.292.

*Compound 14: N-hexamethylene, N',N''-diethylene phosphorotriamidothionate.*—This compound can be prepared according to Example II following here below.

EXAMPLE II 23.7 grams of ethylenimine (about 0.55 mol) and 55.8 grams of triethylamine (about 0.55 mol), dissolved in 700 ml. benzene were charged to a flask and cooled to about 5–10° C. Thereupon 58.0 grams of N-hexamethylene phosphoramidothioic dichloride (0.25 mol) were dissolved in 300 ml. of benzene and this solution was added dropwise under constant stirring to the first mentioned solution, while maintaining the reaction temperature at 5–10° C. during the addition. Upon completion of the addition the reaction admixture was agitated for about 4 hours at a temperature of about 45° C. The precipitated, solid resulting triethylamine hydrochloride was then removed from the reaction admixture by filtration and the benzene solvent was recovered by distillation at a temperature of about 20° C. under vacuum. The recovered reaction product was then purified by low temperature high vacuum distillation. The product, N-hexamethylene, N',N''-diethylene phosphorotriamidothionate, was recovered at a yield of 82%. The structural formula of this compound (Illustrative Compound 14) is:

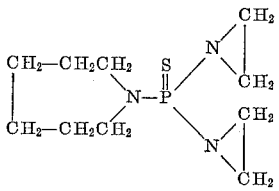

Certain physical properties of this compound were determined. The density $d_4^{20}$ was found to be 1.146 and the refractive index $n_D^{20}$ was found to be 1.5450.

*Group D.—Hydrocarbyl substituted derivatives of ethylenimine (with C—P bonds)*

Compound 15: Phenyl, N,N'-diethylene phosphonodiamidothionate.—This compound can be prepared according to Example III following here below.

EXAMPLE III 94.8 grams of ethylenimine (about 2.2 mols) and 222.6 grams of triethylamine (about 2.2 mols) were dissolved in 2500 ml. of benzene and charged to a flask, while cooling the solution to about 5–10° C. Thereupon 211.0 grams of phenylphosphonodichloridothionate (about 1.0 mol) were dissolved in 1000 ml. of benzene and the solution added dropwise with constant stirring to the first mentioned solution, while maintaining the temperature of the resulting reaction admixture at about 5–10° C. Upon completion of the addition, the reaction admixture was agitated for about one hour at about room temperature (20° C.). The precipitated solid triethylamine hydrochloride was removed by filtration and the benzene solvent was removed by distillation at temperatures of about 20° C. under vacuum. The resulting residue was recrystallized from hot toluene, the crystals were washed with ethyl ether and dried in a vacuum desiccator. The recovered product was phenyl, N,N'-diethylene phosphonodiamidothionate in yields of about 86%. Certain physical properties of this compound (illustrative Compound 15) were determined. The melting point was found to be 103° C. The structural formula of this compound is:

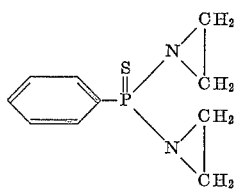

In addition to the above discussed 15 illustrative compounds many other compounds can be prepared to fall within the scope of this invention. For further illustration, as examples, the following preparations were made:

(A) O-p-cresyl, N,N'-diethylene phosphorodiamidothionate, prepared according to Example No. 1 of the parent application, by reacting O-p-cresyl phosphorodichloridothionate with ethylenimine.

(B) O-4-chlorophenyl, N,N'-diethylene phosphorodiamidothionate, by dissolving O-4-chlorophenyl phosphorodithionate, by dissolving O-4-chlorophenyl phosphorodichloridothionate in 100 ml. of acetone and reacting this solution with ethylenimine, otherwise according to Example No. 1 of the parent application.

(C) O-p-methoxyphenyl, N,N'-diethylene phosphorodiamidothionate, by dissolving O-4-methoxyphenyl phosphorodichloridothionate in 100 ml. of acetone and reacting this solution with ethylenimine, otherwise according to Example No. 1 of the parent application.

(D) O-4-chloro-3-methylphenyl, N,N'-diethylene phosphorodiamidothionate, by reacting O-4-chloro-3-methylphenyl phosphorodichloridothionate with ethylenimine according to Example No. 9 of the parent application.

All substitutions and proportions are in equimolecular quantities in all four cases of (A), (B), (C) and (D), when compared with the molecular proportions described in the examples referred to.

The pesticidal activity and usefulness of the pesticides of this invention will be illustrated by a number of methods. Description of the illustrative methods follows below. Percentages in the individual tests are as stated in the method description except as otherwise specified. Special attention is called to the chemosterilant test methods.

Method 1.—Larvicidal Test on House Flies

Larvae are exposed to two concentrations of the chemicals tested for larvicidal action. Fifty grams of standard larval medium is saturated with 100 ml. of water containing in one case 0.1 gram and in the other case 0.5 gram of the chemical in suspension or solution. The treated larval medium is then placed in a pint jar and 100 eggs are added. The jar is placed in an emergence cage. Controls are prepared with untreated larval medium. Four days later the medium is checked to determine whether the eggs have hatched, and to determine larval abnormalities or mortality. The jars are then left undisturbed until the adults in the control tests have emerged, at which time the number and sex of flies in the emergence cages are noted, and the larval medium is examined for delayed larvae or pupae. Later examination of the larval medium is made, if necessary. Four to five days after emergence the flies are offered oviposition medium. Some of the eggs are checked for hatching, and a portion of the remainder is placed on untreated larval medium and another generation of flies is reared and observed for abnormalities. A larvicide will destroy the larvae or prevent their formation. A pupicide will act on the pupae and prevent emergence of adult flies. Above test is at 0.2% and 1% concentration of chemical per 100 parts of larval medium.

Method 2.—Pesticidal Activity on Adult House Flies (a Chemosterilant Test Method)

Food for the flies is prepared by mixing 6 parts of sugar, 6 parts of non-fat dry milk and 1 part of powdered egg. This dry food is treated with 0.1% and 1% of the chemical in acetone solution or suspension. The treated food is then allowed to dry for 24 hours, repulverized and placed in emergence cages containing 100 pupae. Cages containing untreated food are used as controls. Seven days later each cage is examined, as first examination, to note the number of flies emerged, their condition and any acute toxic effect of the treated food. Two days later another examination is made. If insecticidal activity is noticed, the test is not carried further, as the house flies are killed on account of toxicity. If the cages show sufficient number of live flies, at this stage oviposition medium is placed in the cage. On the following day the oviposition medium is inspected for eggs. If none are present, the medium is moistened and examined daily until oviposition occurs or all the adults are dead. The viability of any eggs deposited is determined by inspecting the medium for growing larvae 2 days after oviposition. The larvae are reared to adults and observed for any abnormalities. We filter paper is usually a satisfactory oviposition medium.

Method 3.—Pesticidal Activity on Adult House Flies (a Chemosterilant Test Method)

This is an alternate method to Method 2. Granulated sugar is treated with a 1% solution of the candidate chemical. The sugar is allowed to dry, repulverized and placed in emergence cages, which contain 100 newly emerged adult flies. Cages containing untreated food are used as controls. After 3 days a dish containing untreated fly food consisting of 6 parts of sugar, 6 parts of powdered non-fat dry milk and one part of powdered egg, is added to the cages of the flies. Five to seven days later ½ inch of wet NAIDM medium in a soufflé cup is placed in the cage for oviposition. The same afternoon all egg masses are removed and placed in water to break up the egg masses into individual eggs. The eggs from all egg masses are mixed thoroughly and a random sample of 100 eggs is placed on a small piece of wet black cloth, which is placed on moist larval medium in a rearing container. After 3 days the eggs are examined and the percent hatch is determined. The larvae that hatch crawl from the cloth into the rearing medium, and 5 days after oviposition the number of pupae are counted to determine the number of larvae that reached the pupal stage of development. At the time the oviposition medium is added to the cages, if there is any mortality observed, mortality count of the flies is taken. The percentage of chemical in this test can be varied up and down from the 1% concentration described. The same applies to Method 2. In Method 3 the flies have access to untreated food also, after the first 3 days lapsed. Further: in Method 3 the chemical is in contact with sugar only, thus preventing any inactivation or decomposition which may occur on contact with the powdered milk and powdered egg portion of the food.

Method 4.—Louse Toxicant Test

Woolen cloth is treated with the candidate chemical and young adult body lice are exposed to the treated patches of woolen cloth. This method represents a topical contact method. The patches are dipped in 1% solutions of the chemicals in acetone or another volatile solvent and impaled on pin point to dry. Lice are exposed on the patches in glass beakers for 24 hours. Knockdown is recorded at intervals of 15 minutes, 1 hour and 3 hours, and kill at 24 hours. Patches on which all lice are dead or knocked down are retested in intervals 2 to 7 days until one or more lice are unaffected. After 31 days the test is terminated, even if the patches are still effective. DDT, the standard louse toxicant, is effective for more than 31 days under these conditions.

Method 5.—Mosquoto Larvicide Tests

Compounds are tested as mosquito larvicides by exposing early fourth-instar larvae of *Anopheles quadrimaculatus* to solutions or suspensions of the compound in water. The compounds are dissolved in acetone and added to water; water-soluble compounds remain in solution and the others become finely divided suspensions. Mosquito larvae are added to the treated water and mortality is determined after 24 hours exposure. If 95 to 100 percent mortality occurs at the initial concentration of 10 parts per million, additional tests are made to determine the minimum effective concentration. Under these conditions the standard larvicide, DDT, is completely effective at a concentration of 0.01 p.p.m., but kills only 50 to 70 percent of the larvae at 0.005 p.p.m.

Method 6.—Pesticidal Action on Mexican Fruit Flies (a Chemosterilant Test Method)

Test flies are maintained in 8 cubic inch cages at about 25° C. (without humidity control) in a room ventilated by exhaust fan. The carrier food consists of granulated sugar. 100 milligrams of each compound were dissolved in acetone, added to 5 grams of food medium and tested unreplicated against 50 pairs of flies. Feeding began 1 to 2 days after flies emerged and was continuous for the duration of the experiment (20 days). Flies were egged at 13 and 20 days of age and mortality recorded at weekly intervals. Compounds were evaluated on the basis of total mortality, egg production and hatch responses elicited.

Method 7.—Pesticidal Action on Mexican Fruit Flies (Alternate Method) (a Chemosterilant Test Method)

Test flies were maintained in 8 cubic inch cages at about 25° C. (without humidity control) in a room ventilated by an exhaust fan. 100 milligrams of the candidate compound was dissolved in acetone and added to 5 grams of a carrier food composed of 4 parts granulated sugar and 1 part orange juice crystals. Protein hydrolysate in a separate container provided food supplement. Each compound was offered 50 pairs of flies in one unreplicated lot. Feeding began 1 to 2 days after emergence and was continuous for the 20 days duration of the test. Flies were egged at 13 and 20 days of age and mortality recorded at weekly intervals. Compounds were evaluated on the basis of total mortality, egg production and hatch. The basic difference between Method 7 and Method 6 is the presence in Method 7 of orange juice crystals in the food carried and the presence of protein hydrolysate in a separate container. Both improve on the fly diet, but the orange juice crystals may decompose some of the compounds, which are sensitive to slight acidity.

Method 8.—Pesticidal Action on Mexican Fruit Flies (Alternate Method) (a Chemosterilant Test Method)

For standard diet a mixture was prepared from 3 parts of granulated sugar and 1 part of orange juice crystals. Some protein hydrolisate was made available to the flies as food supplement in a separate container. 10 grams of diet mixture in a 4-inch Petri dish was provided on the day of adult emergence to each unreplicated test cage of 40 to 80 pairs of flies. In each set of tests a control was run with untreated diet mixture. The pesticidal compounds were applied as 10 ml. solution in water, or acetone, or as emulsion in xylol-water-acetone. The great majority of the compounds was applied to the food in acetone. Cages of treated flies were held in glassed-in rooms, adjoining a similar room in which the controls were kept. The rooms were maintained at 70 to 80° F., with relative humidity at 30 to 60 percent. Ventilation was by air exhaust in the room with treated tests and by window vents in the room with untreated tests. Flies were egged initially a few days after sexual maturity and twice thereafter at weekly intervals. Eggs were collected using standard oviposition shells placed in cages for 2 hours late in the morning. Eggs were incubated on blotting paper in closed Petri dishes for 4 days then removed and placed on freshly prepared carrot-yeast medium in plastic trays held in a large conditioned cabinet. Mature larvae were washed from the medium, placed on trays of sand and kept for pupation in the cabinet in which the larvae were held. When adults were due to emerge, the trays of puparia were placed in 8 x 8 x 8 inch cages supplied with untreated diet, and held in the room with the control flies. Class ratings in this test are 0 to 5, the higher being better in chemosterilant activity. Ratings were adjusted based on results obtained in the respective control series. Concentration of compound, based on the food, is listed with individual tests.

Method 9.—Acaricidal Evaluation, Dip Method, Using Two-Spotted Spider Mite

The two-spotted spider mite (*Tetranychus bimaculatus*) is carried in routine culture on lima or red kidney beans under controlled conditions of temperature and humidity. Sub-cultures for testing purposes are obtained from the routine cultures. Infested leaf pieces of predetermined size are removed from the parent culture and placed on the two leaves of the test plant being carried in a nutrient solution in orchid tubes. Mite transfer from the parent culture to the new leaves occurs in about one hour under high intensity illumination. The old leaf pieces are removed and the infested test plants are now ready for use. The treatment consists of dipping the test plants into the test solution momentarily and then placing them back in the rack to drip dry in a sink or other convenient container. The chemical solutions or suspensions are prepared with distilled water held at room temperature to avoid shock effect to the mites. Suspended materials are kept in agitation during dipping by means of a magnetic stirrer. The test racks are held at 78° to 80° during the test period along with the parent cultures. Counts are made for 48 hour periods and for 4 days. Mortality data include counts on mites of all growth stages. Extent of oviposition is recorded if pertinent. Chemical injury to the leaves is recorded, if it occurs. Dosage is 1000 p.p.m. A control set is usually run without the candidate chemicals.

Method 10.—Pesticidal Action on Screw-Worm Fly (*Cochliomyia Hominivorax*). Topical Application (a Chemosterilant Test Method)

Tests were made with adults less than 24 hours old. Topical treatments were made with a micrometer-controlled calibrated syringe. Two microliters of a 10% acetone solution of the test compound was applied to the dorsal thorax of each insect, anesthetized by chilling. In the case of O-(2-chloroethyl) N,N'-diethylene phosphoroamidothionate methanol solution was used instead of acetone solution. Twenty males and 20 females were so treated with 200 micrograms of the chemical and placed in a single cage. The test was continued as described under parallel Method 11, below.

Method 11.—Pesticidal Action on Screw-Worm Fly. Oral Application (a Chemosterilant Test Method)

Also here the tests were made with adults less than 24 hours old. Groups of 100 flies, not selected for sex, were caged separately for oral treatment. The flies were fed a freshly prepared quantity of sugar syrup containing 1% of the test chemical daily for 5 days. The treated food mixture was made available by spreading it over the gauze roof of the cage. A honey feeder was not supplied for oral administration experiments until after the fifth treatment day.

With the exception of the honey for the first 5 days of the oral experiments, ample quantities of water, honey and meat were provided both in Methods 10 and 11, so that the flies could feed on these materials freely. On the eighth day of adult life, fecundity and hatchability were determined. Twenty or fewer females, depending on survival, were given the opportunity to lay eggs in vials containing some ground lean beef. The eggs were subsequently observed for hatching. The criterion for a successful chemosterilant compound is no oviposition or failure of eggs to hatch.

Method 12.—Pesticidal Action on *Drosophila melanogaster* (Pomace Fly) (a Chemosterilant Test Method)

The pesticidal compounds were dissolved in acetone in amounts of 1 mg. of compound in 1 ml. of acetone. Twenty newly emerged flies were first anesthetized by placing test tubes which contained the flies in ice cold water. The flies were then placed in a filter cone made of tissue paper. One ml. of acetone solution was mixed with 0.5 ml. of distilled water and poured over the flies. The flies were allowed to dry and then were placed in a small glass vial which was supplied with a small amount of canned pumpkin. After a period of 24 hours, 5 male and 5 female flies were selected and placed in a separate vial to which was attached another vial containing a pumpkin agar slant. The agar slant was replaced and examined daily. The flies were confined in the vials for a period of 9 to 11 days. Egg counts were made and expressed as average number per female per day. The composite average for a set of 3 controls with untreated food gave in this test 10 eggs per female per day and 8.3 larvae per female per day. This method illustrates a topical application of the pesticide to the insect.

Method 13.—Pomace Fly Insecticidal Evaluation (*Drosophila melanogaster*) (Contact Exposure to Film)

Test materials are deposited within test tubes (25 mm. x 200 mm.) by the aid of solutions in volatile solvents, such as acetone and the test tubes are immediately mechanically rotated to obtain a thin film of the tested toxicant on the walls of the test tubes. Drosophila cultures are carried out in routine manner under controlled temperature and humidity conditions. The breeding and rearing cycle is handled in a manner to assure testing of adults of uniform age. Ten flies are released into each test tube and then stoppered with an absorbent cotton plug holding a protruding tip (Dental Gum) impregnated with sufficient liquid food to carry them for 3 days. The test specimens are observed continuously for the first few minutes to determine whether the tested chemical possesses "Knockdown" properties. Routine counts are then made at 24 hour intervals and reported as percent mortality. This test can be applied in a modified form to evaluate the residual activity of a material as a thin deposited film. In this event, the film is merely aged for the required period of time before releasing the flies into the test vessel.

Method 14.—Dose-Mortality Studies With Pomace Fly (*Drosophila melanogaster*)

This is a method to study in an advanced manner the activity of insecticidal compounds, which have shown promising results in Method 13. Procedure is similar to the one described in Method 13. The candidate materials are dissolved in acetone and 0.5 ml. of the desired concentration is dispensed into the large test tubes. The test tubes are rotated and the acetone allowed to evaporate. Flies are introduced as soon as the solvent evaporated, the test tubes are stoppered with absorbent cotton with a protruding tip containing the liquid food medium for the flies. Dosage is varied in a scale from 1000 p.p.m. (parts per million) to the minimum concentration showing activity. Percent mortality is recorded at 18 hours and 48 hours and Knockdown time is given for 90% and 100% of the flies.

Method 15.—Chemosterilization Tests With Drosophila (Contact by Food)

In this procedure solid Drosophila media (food) was impregnated with candidate material which in a prior step was prepared as a 2.5% Wettable Powder as otherwise described in Method 16. The chemosterilant candidate was added to the food at a dosage of 100 p.p.m. active material based on the total food on weight basis. The test vessels were 250 ml. glass bottles. 25 grams of solid food was added per test vessel. The usual pupating surfaces were prepared from heavy duty paper towels. Forty pupae attached to the pupating surface specially prepared for this purpose were introduced into each test vessel. The adults emerging from such pupae therefore had no other choice than to feed on the medicated food at the bottom of the jar. The freshly emerged adults were allowed to feed, breed and oviposit in the medicated jars for a period of 2 days. At the end of this period the adults were transferred to a second test vessel containing fresh unmedicated food media. This second vessel was a subculture. The original cultures containing the medicated food were then kept under close observation for the appearance of larvae, first appearance of pupae and the eventual emergence of the adults of such pupae. Transfers of the adults were carried out by anesthetizing the flies in the bottles and counting them while the transfer was accomplished. In each series 4 test vessels were used for treated food per chemosterilant candidate used and 4 vessels of control cultures were made where no medicated food was present, but instead unmedicated media was used in the original culture. The results of each set of 4 was averaged and compared with the controls.

Method 16.—Contact Residual Film Test With Confused Flour Beetle (*Tribolium confusam*)

The objective of this test method is to determine the insecticidal activity of individual chemical compounds by a residual film contact method using confused flour beetle (*Tribolium confusam*). According to this procedure the compound to be tested is used either as a Wettable Powder or in form of an acetone solution, the latter being used if the compound is acetone soluble.

In order to prepare a Wettable Powder first a "Premix" is made in powder form consisting of:

|  | Percent |
|---|---|
| Hi Sil 232 | 92 |
| Marasperse N | 4 |
| Pluronic L-61 | 4 |

Hi Sil 232 is an absorbent silica product. Marasperse N is a water soluble metal salt of lignin sulfonate, which is an anionic surface active agent and Pluronic L-61 is a non-ionic surface active agent having low foaming properties. The Wettable Powder concentrates are prepared by mixing 25% of the compound to be tested with 75% "Pre-mix." All percents are by weight. The dosage in the recorded tests relates always to the active ingredient, whether deposited as wettable powder or from acetone solution.

In the next step 1 ml. of the chemical-dosage to be tested is deposited uniformly over a 9.6 cm. diameter Petri plate. The distribution of the film is carried out by a swirling motion of the Petri plate or by uniformly depositing it in a drop form by the aid of the end of a pipette. The deposit is then allowed to dry to a thin film-like layer. Adult confused flour bettles, priorly starved for 24 hours, are then placed ten per plate on duplicate test vessels. Unless otherwise indicated, the Petri plates are closed during the duration of the observation. The insects are examined over the first few hours to observe the effect of the chemical compounds tested. "Knockdown" time is taken and number of insects affected counted. Speed of activity is also noted. Notes are made on any unusual reactions of the insects, such as agitation, paralysis, etc. together with time interval for such effects to occur. Mortality counts are made over a period of days, depending upon the response. If not indicated otherwise, the observation is for a 72 hour period.

Method 17.—Dose-Mortality Studies of Confused Flour Beetles

Pesticides showing promising results in Method 16 are retested by this method to establish Dose-Mortality Values. The test is similar to Method 16. However, in all cases a 25% Wettable Powder was prepared with the Pre-mix preparation. The 25% Wettable Powder preparations were extended with water to give the required dosages. 0.5 ml. of the dosage adjusted wettable powder was carefully pipetted and spotted on the 9.6 cm. diameter glass Petri plates, and allowed to dry over night to a dry film. The following morning 20 adult confused flour beetles were placed upon each plate and kept under observation for a period of 6 days. Doses were 5000 p.p.m., 2500 p.p.m., 1250 p.p.m. and 625 p.p.m. Percent mortality is recorded.

Method 18.—Chemosterilant and Toxicant Activity on Oriental Fruit Flies (Hawaii Fruit Flies, Mixed Sexes Candidate sterilants and antimetabolites are tested against the oriental fruit fly (mixed sexes), in preliminary screening. Depending on solubility, the chemicals are dissolved in water or acetone, and mixed with a hydrolized yeast protein to form a slurry at the concentration of 4% (four percent) candidate chemical in the protein, calculated on dry weight of both materials. The so treated food is made available to the flies from the time of adult emergence. Eggs are collected after 10 to 14 days and hatch noted at 48 hours. Effects on the separate sexes are not determined in this preliminary screening. If females deposit no eggs or eggs that do not hatch, the compound is subsequently tested separately at a range of dosages on each sex mated with normal flies. A control is run without the addition of chemicals.

When considering the results of this test method, it should be noted, that the concentration of chemical compound to food was at a comparatively high level and that no concentration level changes were made. Many candidate compounds showing toxicity at 4% level, could well be good chemosterilants at lower concentrations.

The pesticidal activity of the compounds of this invention is discussed below. It is illustrated with 15 compounds, as listed above. The illustration is in no way intended to limit the scope of this invention.

Group A.—Propylenimine derivatives

*Compound 1: O-ethyl, N,N'-dipropylene phosphorodiamidothionate.*—In Method 3, house flies, at 1% concentration no egg hatch and no pupal development could be observed. At 0.5% concentration there was also no egg hatch. At 0.25% concentration reduced hatch was observed. At 0.1% concentration the hatch became normal. This compound is a chemosterilant on house flies. It is active on male species.

In Method 4, body louse, effectiveness was initial only, knockdown time was 24 hours, showing some activity.

In Method 7, Mexican fruit flies, at 2% concentration in the food the mortality rate both for males and females was 100% with no egg production, showing insecticidal activity of this compound under the test conditions.

In Method 10, screw-worm fly, in topical application, the compound was lethal and no oviposition could occur, showing insecticidal activity.

In Method 11, screw-worm fly, in oral application, oviposition was 100% (normal), and no eggs were hatched, showing chemosterilant activity of this compound for screw-worm flies. This compound acts differently on screw-worm flies when applied topically (Method 10) and orally through food (Method 11). It has chemosterilant activity on males with Method 11.

In Method 12, Drosophila, eggs per female were 5.7 against 10 of the control and larvae per female were 4.0 against 8.3 of the control, showing some chemosterilizing activity.

In Method 18, oriental fruit flies, Compound 1 was a toxicant at the the concentration level applied, showing insecticidal activity. (100% mortality.)

*Compound 2: O-propyl, N,N'-dipropylene phosphorodiamidothionate.*—In Method 3, house flies, this compound showed normal oviposition and lower hatch, with 46% egg hatch and 37% pupal development, showing some chemosterilant activity.

In Method 4, body louse, observations were: activity for 3 days and knockdown time 24 hours, showing activity.

In Method 7, Mexican fruit fly, at 2% concentration the mortality rate for males was zero, for females 14%, egg production was normal, hatch was reduced to 42%, showing some chemosterilant activity.

In Method 10, screw-worm fly, topical application, oviposition was 100%, and hatch was zero, showing good chemosterilant activity on male species particularly.

In Method 11, screw-worm fly, oral application, the oviposition was 100% and hatch was 82%, showing that by oral application this compound is less active as chemosterilant, than by topical application.

In Method 12, Drosophila, eggs per female were 4.1 against 10 of the control and larvae per female were 3.7 against 8.3 of the control, showing fair chemosterilant activity.

In Method 18, oriental fruit flies, Compound 2 was a toxicant at the concentration level applied, showing 100% mortality and insecticidal activity.

*Compound 3: O-phenyl, N,N'-dipropylene phosphorodiamidothionate.*—In Method 3, house flies, this compound showed limited activity, with normal oviposition and 82% hatch.

In Method 6, Mexican fruit fly, at 2% concentration the mortality of adults was 100% with no oviposition, showing insecticidal activity.

In Method 10, screw-worm fly, topical application, oviposition was 100% and hatch was 96%, showing no distinct activity.

In Method 11, screw-worm fly, oral application, the action was lethal on the adults with no oviposition, showing distinct insecticidal activity. Also Compound 3 showed different results in Methods 10 and 11, illustrating the importance of the method of application.

In Method 18, oriental fruit flies, Compound 3 showed 20 eggs vs. 1500 to 3000 of the control; zero egg hatch vs. 80–90% of the control and 95% mortality. This indicates distinct insecticidal activity at the concentration level applied, coupled also with distinct chemosterilant activity, as none of the eggs hatched. This compound at lower concentrations is expected to show useful chemosterilant activity.

*Group B.—Derivatives of 2.2-dimethylethylenimine*

*Compound 4: O-ethyl, N,N'-bis(2,2-dimethylethylene) phosphorodiamidothionate.*—In Method 3, house fly, at 1% concentration lower hatch was found. The egg hatch was 15% and the pupal development was 13% of normal. At 2.5% concentration the compound was toxic and had insecticidal effect. At 0.5% concentration no activity was observed under the conditions of this method. In the area of 1% concentration the chemosterilant activity was distinct.

In Method 6, Mexican fruit fly, at 2% concentration mortality of male adults was 86%, of female adults 78%. Oviposition was low, hatch was 22%. This compound showed fair insecticidal properties at the given concentration, but is not suitable as chemosterilant, on account of the high toxic effect on adults.

In Method 10, screw-worm fly, topical application, oviposition was zero, hatch could not be measured in absence of oviposition. The compound is an excellent chemosterilant and acts on females also.

In Method 11, screw-worm fly, oral application, oviposition was 72% and hatch was 59% of normal, showing by this method a chemosterilant activity of far lesser degree, than by Method 10. The two methods show different results.

In Method 18, oriental fruit flies, Compound 4 was a toxicant at the concentration level applied, showing 100% mortality and insecticidal activity.

*Compound 5: O-propyl, N,N'-bis(2,2-dimethylethylene) phosphorodiamidothionate.*—In Method 3, house fly, at 1% concentration the oviposition was normal, the egg hatch was lowered to 18% and pupal development to 10%. At 2.5% concentation the egg hatch was reduced at 2% of normal and the pupal development was zero percent, indicating good chemosterilant activity.

In Method 4, body louse, the knockdown time was 24 hours, the duration of activity was instant. Results show some activity.

In Method 5, mosquito larvae, at 10 p.p.m. concentration in 24 hours 4% of larvae were killed, showing moderate activity.

In Method 10, screw-worm fly, topical application, the compound was lethal to adults, showing insecticidal activity.

In Method 11, screw-worm fly, oral application oviposition was 96% and hatch was 94%, showing neither insecticidal, nor distinct chemosterilant activity. Also in the case of this compound the Methods 10 and 11 showed different type of activity.

In Method 12, Drosophila, no distinct activity was found as a chemosterilant.

In Method 18, oriental fruit flies, Compound 5 showed between 300 and 1000 eggs vs. 1500 to 3000 of the control, 0 to 40% egg hatch vs. 80–90% of the control and 30 to 80% mortality. These results show at the concentration level applied: partial insecticidal activity together with some chemosterilant activity, reducing the number of eggs and the percentage of hatch.

*Compound 6: O-phenyl, N,N'-bis(2,2-dimethylethylene) phosphorodiamidothionate.*—In Method 3, house fly, egg hatch was close to normal at 99% and pupal development was 86%, showing very slight activity as chemosterilant.

In Method 6, Mexican fruit fly, mortality of males was 66%, of females 41%, oviposition was normal and hatch was 52%. Compound 6 showed in Method 6 a mederate insecticidal activity and reduced hatch signifying some chemosterilant activity also.

In Method 10, screw-worm fly, topical application, oviposition was 85% and hatch 66%, showing moderate chemosterilizing activity.

In Method 11, screw-worm fly, oral application, the compound was lethal to adults, showing insecticidal activity. Methods 10 and 11 yield different results with this compound.

In Method 18, oriental fruit flies, Compound 6 showed 200 to 800 egg count vs. 1500 to 3000 of the control; 0% to 20% egg hatch vs. 80–90% of the control and 50 to 70% mortality. At the concentration level applied, Compound 6 is a partial insecticide, but shows distinct chemosterilant activity demonstrated by the low percentage of the egg hatch.

*Group C.—Derivatives of ethylenimine*

*Compound 7: O-ethyl, N,N'-diethylene phosphorodiamidothionate.*—In Method 2, house fly, at 0.1% concentration oviposition was normal, but no hatch occurred, indicating good chemosterilant activity on male species. At 1% concentration 98% mortality was observed with no oviposition. Indicating insecticidal activity, at 0.05% and lower concentrations no effect on development of adults or fertility was observed.

In Method 1, at 2% concentration Compound 7 is a larvicide.

Since Method 2 does not demonstrate whether one or both sexes of house flies have been sterilized, additional studies were made with Compound 7 to determine its effect on individual sexes. Method 2 was modified as follows: males and females fed for 5 days on food treated with Compound 7 were crossed with flies of the opposite sex that had been fed either treated or untreated food. Five insects of each sex were used, and all flies were maintained on untreated food thereafter. On the seventh day oviposition medium was made available and the eggs were counted. Egg viability was determined by inspecting the medium at a later date for larvae or pupae. Fecundity and fertility were determined by offering oviposition medium in this way at weekly intervals until 3 ovipositions were made or viable eggs were obtained. Each test was replicated twice and compared to untreated checks run concurrently. The following table shows the findings with "V" designating some viable eggs, "NV" non-viable eggs and "No" designating no oviposition.

| Concentration (percent) | Sex sterilized | Number and condition of eggs from flies after the— | | |
|---|---|---|---|---|
| | | 1st egging | 2nd egging | 3rd egging |
| 0.25 | Male | NV | NV | NV. |
| | Female | NV | V | No. |
| | Both | NV | NV | No. |
| 0.50 | Male | NV | NV | NV. |
| | Female | V | No | No. |
| None (control) | Neither | V | V | V. |

As can be seen, Compound 7 induced sterility in male house flies at both the 0.25% and 0.50% concentrations.

It did not completely sterilize the females at these concentrations instantaneously, but a delayed sterilization seems to have occurred. Comparison of the three eggings of the treated females leaves the possibility open, that the treated females caused some sterilization of the untreated males by mating.

Method 8, Mexican fruit fly, showed with Compound 7 normal oviposition and reduced hatch. At 0.1% concentration hatch was 53.4% with a rating 3, and at 1.0% concentration the hatch was 15.3%, with a rating 5. The ratings in this method depend on the results of the control checks and run from 0 to 5, the higher the rating the stronger the sterilizing effect, and 5 being the highest rating used.

Activity on confused flour beetle with Method 16 showed 100% kill, indicating insecticidal activity. With Method 17 activity was found in the range of 500 to 2500 parts per million (p.p.m.). The rate of activity was slow, which is general property of insecticides with this insect species.

When testing Compound 7 with Method 13 on Drosophila, 100% kill was observed, indicating insecticidal activity. In Method 14 at 500 p.p.m. concentration insecticidal activity was observed. In chemosterilant activity with Method 15 on Drosophila the hatch was reduced to a 118 average against a 310 average of the control set. It should be noted, that in Method 15 the concentration of Compound 7 was 100 p.p.m. of food weight, which is below that normally used for chemosterilization.

*Compound 8: O-propyl, N, N'-diethylene phosphorodiamidothionate.*—With Method 1, house fly, this compound is a larvicide at 2% concentration.

With Method 2, house fly, both at 0.1% and 1.0% concentration this compound was toxic, indicating insecticidal activity. At 0.05% concentration toxicity was lost, but no chemosterilization occurred. This compound has insecticidal activity against house flies.

With Method 12, Drosophila, the eggs per female value gave an average of 4.6 against 10 of the control. The larvae per female value was 1.9 against 8.3 of the control. These values indicate reduced oviposition and greatly reduced hatch, showing a distinct and pronounced chemosterilant activity for Compound 8 against Drosophila.

*Compound 9: O-butyl, N,N'-diethylene phosphorodiamidothionate.*—In Method 3, house fly, this compound showed 1% egg hatch and 0% pupal development. In varying the concentration of the compound the following observations were obtained: Applying up to 5% concentration, the oviposition was normal, indicating no activity on females. Wherever there was activity the males were chemosterilized. In the concentration range of 0.25% to 5% the egg hatch ranged from 5% to zero and the pupal development ranged between zero and one per 100 eggs. At 0.10% concentration the egg hatch was 12% and pupal development was 8%. At 0.05% concentration both the egg hatch and the pupal development were 78%, i.e. close to normal. The range from 0.25% to 5% can be considered as fully active range for chemosterilization, 0.10% concentration as partially active and 0.05% as representing the inactive range.

In Method 5, mosquito larvae, at 10 p.p.m. concentration the percent kill was 2% in a 24 hour period, indicating some activity.

In Method 4, body lice, the compound was active for 3 days and the knockdown time was 24 hours.

In Method 7, Mexican fruit fly, mortality of both males and females was 100% with no oviposition, indicating insecticidal activity.

In Method 10, screw-worm fly, topical application, compound 9 was lethal both to males and females, indicating insecticidal activity. The same observation was made in Method 11, screw-worm fly, oral application, wherein lethal effect was observed also, both on males and females. This compound is an insecticide against screw-worm fly.

In method 18, oriental fruit flies, Compound 9 was a toxicant at the concentration level applied, showing 100% mortality and insecticidal activity.

*Compound 10: O-isoamyl, N,N'-diethylene phosphorodiamidothionate.*—In Method 3, house fly, egg hatch was 1%, pupal development was 1%, indicating distinct chemosterilant activity on males. The oviposition was normal at the 1% concentration of this method. At 0.5% concentration hatch was 99%, but pupal development was only 4% of normal. At this lower concentration Compound 10 acts primarily on the pupae.

*Compound 11: O-decyl, N,N'-diethylene phosphorodiamothionate.*—In Method 3, house fly, Compound 10, showed 0% egg hatch and 0% pupae, indicating excellent chemosterilant activity. In varying the concentration, below 0.25% the hatch was normal (no activity), at 0.25% concentration the hatch was low (reduced) and at 1% concentration no hatch occurred.

In Method 5, mosquito larvae, this compound showed distinct activity, killing 32% larvae at 10 p.p.m.

In Method 7, Mexican fruit fly, Compound 11 was toxic to 52% of the males, did not effect fatally the females at all (no mortality), oviposition was low, hatch not influenced. This compound is a male toxicant and reduces the oviposition of the females.

In Method 10, screw-worm fly, topical application, oviposition was 100% (normal) and hatch reduced to 72%, indicating some, but insufficient activity as chemosterilant. In Method 11, screw-worm flies, oral application, whereas the oviposition was also normal (100%), hatch was reduced to 6%, showing distinct chemosterilant activity by this method. Methods 10 and 11 do give different results with Compound 11.

In Method 16, Compound 11 showed activity against Confused flour beetle, killing in a 3 day period 30% of the adults and 85% of the larvae. In Method 13, against Drosophila the activity of this compound was negligible at 1000 p.p.m. concentration.

In the acaricidal evaluation of Method 9, this compound showed 100% mortality both in a 48 hours and 4 days duration tests. This activity of Compound 11 against the two spotted spider mite is so much more surprising, as other compounds containing shorter O-alkyl chains, but otherwise of similar constitution, do not show distinct activity.

In Method 18, oriental fruit flies, Compound 11 showed 16 to 3000 eggs vs. 1500 to 3000 of the control, 0% egg hatch vs. 80–90% of the control and 10% to 30% mortality. This indicates, that Compound 11 is a distinct and useful chemosterilant for oriental fruit flies. As in many cases the oviposition was normal but no hatch occurred, it is indicated, that this compound is a male sterilant. Its toxic effect at the high concentration level of this method was mild.

*Compound 12: O-phenyl, N,N'diethylene phosphorodiamidothionate.*—In Method 1, house fly, Compound 12 is a pupicide at 2% concentration.

In Method 2, house fly, at 1% concentration this compound is toxic to adults and has insecticidal activity. At 0.1% concentration it is ineffective.

In Method 8, Mexican fruit fly, Compound 12 was ineffective at 0.1% concentration, however, at 1% concentration it obtained rating 5, highest, with greatly reduced oviposition and only 9.5% hatch. Compound 12 showed 0.4 egg per fly day in 3 eggings vs. 11.8 eggs per fly day of the control in 2 eggings. Actual number of eggs was 42 with treatment (1%) in 3 eggings vs. 1200 of the control in 2 eggings. Therefore Compound 12 is a successful chemosterilant in 1% concentration against Mexican fruit fly.

*Compound 13: O-2-chloroethyl, N,N'-diethylene phosphorodiamidothionate.*—In Method 3, house fly, this compound gave 0% egg hatch and 0% pupal development, showing excellent chemosterilant activity.

Against mosquito larvae in Method 5, its activity was low.

In Method 7, Mexican fruit fly, no male or female adults were killed (nontoxic), oviposition was normal, hatch reduced to 53%, indicating chemosterilant activity on the male species.

Against screw-worm fly, in Method 10, topical application, oviposition was reduced to 61%, but hatch was 84%, indicating mild chemosterilant activity. On the other hand, by Method 11, oral application this compound was lethal on the adults and acted as an insecticide.

In Method 18, oriental fruit flies, Compound 13 showed 0 to 400 eggs vs. 1500 to 3000 of the control, 0% egg hatch vs. 80–90% of the control and 30% to 90% mortality. Whereas at the concentration level tested this compound had some toxicant effect, showing insecticidal activity to a degree, its chemosterilant activity is obviously demonstrated by the fact that no eggs hatched at any time.

Compound 14: N-hexamethylene, N',N''-diethylene phosphorotriamidothionate.—In Method 3, house fly, Compound 14 gave 0% egg hatch and 0% pupal development, showing excellent chemosterilant activity. In varying the concentration, the following results were obtained:

| Concentration, percent | Hatch, percent | Pupae |
|---|---|---|
| 0.1 | 100 | None |
| 0.25 | 18 | None |
| 1.0 | None | None |

Oviposition was normal in all 3 concentrations, indicating male sterilant activity.

In Method 6, Mexican fruit flies, at 2% concentration, mortality of males was 86%, mortality of females was 15%, egg production was 0% and no hatch occurred, indicating distinct chemosterilant activity coupled with some toxic effect at this concentration. This compound is also a female chemosterilant, as far as Mexican fruit flies are concerned.

Against screw-worm flies, Compound 14 acts as chemosterilant with both methods. In Method 10, topical application, oviposition was 0 and hatch 0, indicating activity on females also. In Method 11, oral application, oviposition was 53%, hatch was 0, indicating complete sterilization of the males and some sterilization of the females also.

In Method 18, oriental fruit fly, Compound 14 showed an egg count of 8 to 80 vs. 1500 to 3000 of the control and 0% egg hatch vs. 80–90% of the control, with a mortality of 70 to 90%. Whereas at the concentration level tested this compound had some toxicant effect, showing insecticidal activity, its chemosterilant activity is demonstrated by the fact that no eggs hatched at any time.

*Group D.—Hydrocarbyl substituted derivatives of ethylenimine (with C—P bonds)*

Compound 15: Phenyl, N,N'-diethylene phosphonodiamidothionate.—In Method 3, house fly, egg hatch was 0% and pupal development 0%. At 0.5% concentration both the egg hatch and pupal development were reduced to about 50% and below 0.5% concentration the egg hatch and oviposition was normal. Compound 15 is a chemosterilant for house flies. It acts primarily on the males.

In Method 7, Mexican fruit fly, mortality of males was 100%, mortality of females was 0%, oviposition was normal, hatch was reduced to 24%. At the concentration level of this method Compound 15 was a male toxicant, did not affect the female Mexican fruit flies (no mortality and normal oviposition), but reduced the hatch.

In Method 12, Drosophila, Compound 15 showed moderate activity, yielding 7.7 eggs per female vs. 10 of the control and 4.2 larvae per female vs. 8.3 of the control. It reduced larvae by about 50%.

In Method 10, screw-worm fly, topical application, Compound 15 was inactive, yielding 100% oviposition and 100% hatch, but in Method 11, screw-worm fly, oral application, it was lethal in activity, showing insecticidal action on the adults. Here again the two methods showed divergent results with screw-worm flies.

In Method 18, oriental fruit flies, Compound 15 showed insecticidal activity at the concentration level tested, with 99% mortality.

When considering the above test results, it should be noted, that not all the listed compounds have been tested with all the listed methods.

In summary of the above illustrative tests the following can be stated:

HOUSE FLIES

In Method 1, larvicidal activity was shown by Compounds 7 and 8, pupicidal activity by Compound 12.

In Methods 2 and 3: Insecticidal activity was shown at least at some concentration levels by Compounds 4, 7, 8 and 12. Chemosterilant activity was shown at least at some concentration levels by Compounds 1, 5, 7, 9, 11, 13, 14 and 15. Distinct chemosterilant activity (even if with some of them not complete), was shown by Compounds 2, 4 and 10.

BODY LICE

In Method 4, distinct activity was shown with Compounds 2 and 9, and some activity was shown, amongst others, with Compounds 1 and 4.

MOSQUITO LARVAE

In Method 5, distinct activity was shown by Compound 5, some activity by Compounds 9 and 13.

MEXICAN FRUIT FLIES

In Methods 6, 7 and 8: Insecticidal activity was shown by Compounds 1, 3 and 9; some insecticidal activity was shown by Compounds 4, 6 and 11. Excellent chemosterilant activity was shown by Compounds 7 and 12; chemosterilant activity of varying degree was shown by Compounds 2, 11 (male toxicant), 13, 14 (somewhat toxic) and 15 (male toxicant).

TWO-SPOTTED SPIDER MITE

Excellent acoridical activity was shown in Method 9 by Compound 11.

SCREW-WORM FLIES

In Methods 10 and 11: Chemosterilant activity was shown in topical application by Compounds 2 and 4, in oral application by Compounds 1 and 11 (distinct), and in both topical and oral application by Compound 14. Insecticidal activity was shown both in topical and oral application by Compound 9, in topical application by Compounds 1 and 5, and in oral application by Compounds 3, 6, 13 and 15. Low activity or no activity was shown by Compounds 3, 6, 11 and 13 in topical application and by Compounds 2 and 4 in oral application.

DROSOPHILA MELANOGASTER (POMACE FLY)

In the chemosterilization test of Method 12 Compound 8 was found to be a pronounced chemosterilant; Compound 2 was a fair chemosterilant; Compounds 1 and 15 showed about 50% activity and Compound 5 was inactive.

In the insecticidal test of Methods 13 and 14 Compound 7 showed 100% kill at 1000 p.p.m. and an $LD_{50}$ value of 460 (Method 14), whereas Compound 9 had negligible activity.

In the chemosterilant test of Method 15 Compound 7 showed distinct chemosterilant activity at 100 p.p.m. concentration, reducing the population to 118 vs. 310 of the control.

CONFUSED FLOUR BEETLE

In Methods 16 and 17 insecticidal activity was shown by Compounds 7 and 11. The latter showed moderate activity. The active range for Compound 7 is from 500 p.p.m. to 2500 p.p.m.

ORIENTAL FRUIT FLY (HAWAII FRUIT FLY)

In Method 18 at the concentration level applied, distinct chemosterilant activity without appreciable toxicant effect was shown by Compound 11. Distinct chemosterilant activity coupled with partial insecticidal activity was shown by Compounds 3, 5, 6, 13 and 14. Insecticidal activity was shown by Compounds 1, 2, 4 and 9.

The testing methods, listed above, illustrate oral and topical applications. Oral applications are illustrated by Methods 1, 2, 3, 6, 7, 8, 11, 15 and 18. Topical application where the active agent is applied to the pests is illustrated by Methods 10 and 12. Topical application where the active agent is applied to a surface other than the pests themselves, is illustrated by Methods 4, 13, 14, 16 and 17. Methods 5 and 9 are in a special category, as the active agent may be considered as dispersed over the surface of the food for the pests or it may act by contact of the exterior body of the pests.

Presence of volatile organic solvents and/or water as carrier of the active compounds is illustrated by Methods 1, 2, 3, 4, 5, 6, 7, 8, 10, 11, 12, 13, 14, 16 and 18. Wettable powder application is illustrated by Methods 15, 16 and 17. Method 9 is in a special category, wherein distilled water is used as carrier.

Generally speaking the pesticidal compounds of this invention, whether insecticides, miticides or chemosterilants, may be applied in the usual manner known in the art. They may be used in conjunction with gaseous, liquid or solid inert carriers customarily employed in the production of pesticidal compositions, such as dusting powders, suspensions, emulsions, solutions, aerosols, etc. As illustrated, they may be incorporated into the food of the pests and properly dispersed therein. For insecticidal use sprays and aerosols or dusts may be used.

Solvents may include acetone, methyl alcohol, isopropyl acetate, butyl carbitol acetate, isopropyl alcohol, cyclohexane, cyclohexanone, benzene, xylene, methylated naphthalenes (also known as aromatic petroleum derivative solvents), carbon tetrachloride, methyl chloride and others, either alone or in admixture. The methylated naphthalenes in Kauri-Butanol values range between 65 and 100, in initial boiling point between 390° and 460° F. and in end boiling point between 485° and 590° F.

Solid carriers may be selected from talc, clay, kaolin, lime, bentonite, pumice, fuller's earth, absorbent silicas, pyrophilite, etc., preferably in finely divided state. These can be applied in pesticidal dusts, or as wettable powders with the addition of surface active agents. The latter can be made into water suspensions or dispersions.

For aerosol application liquefied gases are used as solvents, such as fluorochlorethanes, fluorochlormethanes or methyl chloride and they are applied from aerosol bombs made from the solutions.

Solvent solutions may be converted to water suspensions or emulsions. For the preparation of emulsions or wettable powders surface active agents are incorporated into the pesticidal compositions. In preparing emulsions they aid emulsification, whereas in preparing wettable powders they aid suspension and dispersion properties. The following is a list of some useful surface active agents:

Triton X-161, a blend of alkyl aryl polyether alcohols with organic sulfonates;

Pluronic L-61, a condensate of ethylene oxide with a hydrophobic base formed by condensing propylene oxide with propylene glycol;

Marasperse N, sodium lignosulfonate;

Igepal CO-730, an alkylphenoxypoly (ethyleneoxy)ethanol, formed by condensing nonylphenol with ethylene oxide;

Diglycol oleate;

p-Isooctylphenyl ether of polyethylene glycol;

Polyalkylene glycol derivatives;

Alkylbenzenesulfonate;

Alkene sulfonates;

Alkyl sulfates, such as fatty alcohol sulfates;

Condensation product of 1 mol of octyl phenol with 8 mols of ethylene oxide;

Naphthalene sulfonates and alkyl naphthalene sulfonates;

Ricinoleic acid butyl ester sulfonate.

With regard to surface active agents for oral application of chemosterilants, lack of toxicity is a requirement. In insecticidal or miticidal application toxicity of a surface active agent may be an added advantage, as in preparations for this application addition of secondary toxicants is frequently desirable.

Water suspensions can be prepared by dissolving the water-insoluble active compound in a water miscible solvent, like acetone, and adding this solution to water under agitation. By another method a water wettable dry powder mixture is prepared, e.g. containing a water dispersible clay carrier, with or without the presence of surface active agents and this mixture is dispersed in water prior to use.

Concentrated pesticidal compositions may contain 0.1% to 10% by weight of active compound and 99.9% to 90% of inert carrier, such as solvent, water, solid powder carriers, surface active agents and their admixture.

Aziridinyl compounds are sensitive to acids and undergo polymerization easily. To prevent decomposition and/or polymerization during storage, it is advantageous to incorporate into the pesticidal compositions stabilizers. Triethylamine and morpholine are examples of suitable stabilizers, amongst others.

We claim:

1. A method of chemosterilizing insects and mites which comprises exposing insects and mites to the action of a chemosterilizing amount of a compound having the structural formula:

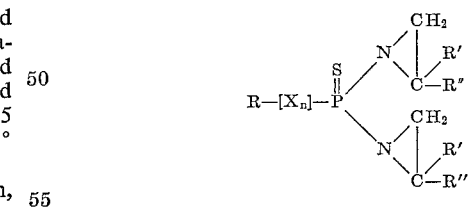

wherein X is selected from the group consisting of oxygen and sulfur, wherein $n$ is a digit from zero to one, wherein R is selected from the group consisting of (a) alkyl containing 1-18 carbon atoms (b) alkenyl containing 1-18 carbon atoms (c) aryl selected from the group consisting of phenyl and naphthyl (d) alkaryl containing 6-18 carbon atoms (e) aralkyl containing 6-18 carbon atoms and (f) alicyclic containing 3-18 carbon atoms when $n$ is as aforesaid and (g) wherein R is a heterocyclic containing 5-12 carbon atoms and having nitrogen present as the heteroatom in the ring and bonded to the phosphorus atom when $n$ is zero, and wherein R' and R" are selected from the group consisting of hydrogen and a hydrocarbyl which is a member of the class consisting of alkyl and aryl containing 1-12 carbon atoms.

2. The method of claim 1, wherein the compound is O-ethyl, N,N'-dipropylene phosphorodiamidothionate.

3. The method of claim 1, wherein the compound is O-ethyl, N,N'-diethylene phosphorodiamidothionate.

4. The method of claim 1, wherein the compound is O-decyl, N,N'-diethylene phosphorodiamidothionate.

5. The method of claim 1, wherein the compound is O-2-chloroethyl, N,N'-diethylene phosphorodiamidothionate.

6. The method of claim 1, wherein the compound is N-hexamethylene, N',N''-diethylene phosphorotriamidothionate.

References Cited by the Examiner

UNITED STATES PATENTS 2,802,824  8/57  Tolkmith et al. _____ 260—239

FOREIGN PATENTS

| | | |
|---|---|---|
| 491,493 | 3/53 | Canada. |
| 491,653 | 3/53 | Canada. |
| 1,174,704 | 11/58 | France. |
| 1,048,583 | 1/59 | Germany. |

OTHER REFERENCES

Auerbach: Annals of the New York Academy of Sciences, volume 68, Art. 3, pages 731–749 (April 1958).

Borkovec: "Sexual Sterilization of Insects by Chemicals", Science, volume 137 (September 1962), pages 1034–1036.

Grechkin et al.: Doklady Akad. Nauk, U.S.S.R., volume 129, pages 569–71 (1959), as abstracted—Chemical Abstracts, volume 54, page 7671 (1960).

Jackson et al.: Brit. J. Pharmacol (1959), volume 14, pages 149–157.

Le Brecque: Journal of Economic Entomology, volume 54, No. 4, pages 685–689 (August 1961).

Sato: Takamini Kenkyusho Nempo, volume 9, pages 17–20 (1957), as abstracted—Chemical Abstracts, volume 55, page 1564 (1961).

JULIAN S. LEVITT, *Primary Examiner.*